United States Patent
Neuhaus et al.

(10) Patent No.: US 7,263,746 B2
(45) Date of Patent: Sep. 4, 2007

(54) EXPANSION RING ASSEMBLY WITH REMOVABLE DRIVE MECHANISM

(75) Inventors: Ronald W Neuhaus, Fort Wayne, IN (US); Andrew J Happel, Fort Wayne, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 193 days.

(21) Appl. No.: 11/199,829

(22) Filed: Aug. 9, 2005

(65) Prior Publication Data
US 2006/0033330 A1 Feb. 16, 2006

Related U.S. Application Data

(60) Provisional application No. 60/600,543, filed on Aug. 11, 2004.

(51) Int. Cl.
F16L 33/213 (2006.01)
F16L 55/163 (2006.01)
F16B 2/04 (2006.01)

(52) U.S. Cl. ............ 24/279; 277/616; 404/25

(58) Field of Classification Search ........ None
See application file for complete search history.

(56) References Cited

U.S. PATENT DOCUMENTS

| | | | |
|---|---|---|---|
| 4,097,171 A | 6/1978 | Fier | 404/26 |
| 4,215,868 A | 8/1980 | Skinner et al. | 277/1 |
| 4,281,944 A | 8/1981 | Bowman | 404/26 |
| 4,469,467 A | 9/1984 | Odill et al. | 404/25 |
| 4,478,437 A | 10/1984 | Skinner | 285/189 |
| 4,619,555 A | 10/1986 | Skinner et al. | 405/154 |
| 4,702,645 A | 10/1987 | Skinner et al. | 405/154 |
| 4,872,780 A | 10/1989 | Bowman | 404/26 |
| 4,927,290 A | 5/1990 | Bowman | 404/26 |
| 5,004,822 A | 4/1991 | Elliott et al. | 556/115 |
| 5,150,927 A * | 9/1992 | Skinner | 285/189 |
| 5,209,601 A | 5/1993 | Odill et al. | |
| RE34,550 E | 2/1994 | Bowman | 404/26 |
| 5,316,407 A * | 5/1994 | Miller | 404/25 |
| 5,431,459 A | 7/1995 | Gundy | 285/237 |
| 5,474,396 A | 12/1995 | Bravo | 404/26 |
| 5,496,128 A | 3/1996 | Odill | 404/25 |
| 5,507,500 A | 4/1996 | Skinner et al. | 277/9 |
| 5,529,312 A | 6/1996 | Skinner et al. | 277/9.5 |
| 5,570,890 A * | 11/1996 | Skinner et al. | 277/606 |
| 5,642,891 A | 7/1997 | Skinner | 277/101 |
| 5,732,955 A * | 3/1998 | Skinner et al. | 277/602 |
| 5,876,039 A | 3/1999 | Skinner et al. | 277/617 |
| 5,954,344 A * | 9/1999 | Miller | 277/616 |
| 6,805,359 B2 * | 10/2004 | Neuhaus et al. | 277/576 |

(Continued)

Primary Examiner—Robert J. Sandy
(74) Attorney, Agent, or Firm—Baker & Daniels LLP (57) ABSTRACT

An expansion ring assembly for sealing a gasket within an opening in the wall of a structure, the assembly including a drive mechanism having a pair of block members each having a threaded bore, and a bolt having oppositely threaded ends respectively threaded within the bores. The block members are removably engaged with respective ends of the expansion ring. An oversleeve is disposed in overlapping relationship with the expansion ring ends, and the expansion ring ends and the oversleeve include cooperating ratcheting structures. Rotation of the bolt of the drive mechanism in a first direction causes the block members to move outwardly along the bolt to expand the expansion ring and concurrently sequentially engage the ratcheting structures of the expansion ring ends and the oversleeve.

18 Claims, 5 Drawing Sheets

U.S. PATENT DOCUMENTS

| | | |
|---|---|---|
| 7,146,689 B2 * | 12/2006 | Neuhaus et al. ............... 24/279 |
| 2002/0104208 A1 | 8/2002 | Kurdziel et al. ............... 29/235 |
| 2002/0153668 A1 | 10/2002 | Deeb et al. ................. 277/606 |
| 2004/0080118 A1 | 4/2004 | Neuhaus et al. ............ 277/606 |
| 2005/0006853 A1 | 1/2005 | Neuhaus et al. ............ 277/576 |

* cited by examiner

FIG_1

FIG_5

EXPANSION RING ASSEMBLY WITH REMOVABLE DRIVE MECHANISM

CROSS REFERENCE TO RELATED APPLICATIONS

This application claims the benefit under Title 35, U.S.C. §119(e) of U.S. Provisional Patent Application Ser. No. 60/600,543, entitled EXPANSION RING ASSEMBLY WITH REMOVABLE DRIVE MECHANISM, filed on Aug. 11, 2004.

BACKGROUND OF THE INVENTION

1. Field of the Invention

The present invention relates to an expansion ring assembly, and associated method, for sealing an annular gasket to a rigid structure.

2. Description of the Related Art

In underground pipe systems, it is often necessary to connect a pipe in a sealed manner within an opening in the wall of a rigid structure, such as a manhole riser or monolithic base, for example. Typically, an annular, flexible elastomeric gasket is placed within the opening in the wall, followed by fitting an expansion ring against the interior surface of the gasket. Thereafter, an expansion mechanism is used to radially expand the expansion ring and lock same in an expanded condition in which the gasket is sealingly compressed between the expansion ring and the opening in the wall of the structure. Finally, a pipe is inserted through the gasket, and one or more clamps are installed around a portion of the gasket which extends from the wall to sealingly compress the extending portion of the gasket between the clamps and the outer surface of the pipe. In this manner, a sealed connection is made between the pipe and the structure.

One known expansion ring assembly is disclosed in U.S. Pat. No. 5,150,927, assigned to the assignee of the present invention. This assembly includes an expansion ring, or compression sleeve, having ends with ratcheting teeth. An arcuate locking section overlaps the expansion ring ends and includes two sets of ratcheting teeth in respective engagement with the ratcheting teeth of the expansion ring ends. A scissors-type, hinged installation tool, usually operated with a hydraulic drive device, is used to expand the expansion ring such that the ratcheting teeth of the ring ends sequentially engage the ratcheting teeth of the locking section until the expansion ring has been expanded to a desired extent. Thereafter, the installation tool is removed from the expansion ring, and the ratcheting engagement between the expansion ring ends and the locking section maintain the expansion ring in its expanded condition.

Although the foregoing expansion ring assembly is effective for installing a gasket within an opening in a structure, the scissors-type installation tool and hydraulic drive device can be heavy and cumbersome to use in the field during installation.

To address the foregoing concern, another known expansion ring assembly includes a drive mechanism having a pair of block members with oppositely threaded bores therethrough, and a bolt having oppositely threaded ends threaded within the respective threaded bores of the block members. The bolt additionally includes a central nut which may be engaged by a suitable tool to rotate the bolt. The block members are respectively engaged with opposite ends of the expansion ring, and rotation of the bolt in a first direction simultaneously drives the block members apart from one another along the bolt to radially expand the expansion ring. The foregoing expansion ring assembly is discussed in detail in U.S. patent application Ser. No. 10/280,917, entitled EXPANSION RING ASSEMBLY, filed on Oct. 25, 2002, assigned to the assignee of the present invention, the disclosure of which is expressly incorporated herein by reference.

Among other advantages which are discussed in detail in the above-incorporated U.S. patent application Ser. No. 10/280,917, the drive mechanism of the foregoing expansion ring assembly is easily operated with a simple tool such as a torque wrench, for example, allowing easy installation of the expansion ring assembly in the field. However, after the drive mechanism is actuated to expand the expansion ring and sealingly compress a gasket against an annular opening in a structure, the drive mechanism must remain in place to maintain the expansion ring in its expanded condition and in turn maintain compression of the gasket against the annular opening in the structure. This increases the overall cost of each expansion ring assembly.

What is needed is an expansion ring assembly which is an improvement over the foregoing.

SUMMARY OF THE INVENTION

The present invention provides an expansion ring assembly for sealing a gasket within an opening in the wall of a structure, the assembly including a drive mechanism having a pair of block members each having a threaded bore, and a bolt having oppositely threaded ends respectively threaded within the bores. The block members are removably engaged with respective ends of the expansion ring. An oversleeve is disposed in overlapping relationship with the expansion ring ends, and the expansion ring ends and the oversleeve include cooperating ratcheting structures. Rotation of the bolt of the drive mechanism in a first direction causes the block members to move outwardly along the bolt to expand the expansion ring and concurrently sequentially engage the ratcheting structures of the expansion ring ends and the oversleeve. Once the expansion ring is expanded to a desired extent, the bolt of the drive mechanism may be rotated in a second direction opposite the first direction to move the block members inwardly along the bolt and allow disengagement of the block members from the expansion ring ends and removal of the drive mechanism. The expansion ring ends are maintained in their expanded condition by the engagement of the ratcheting structures of the expansion ring ends and the oversleeve. In another embodiment, overlapping ends of the expansion ring have ratcheting structure therebetween, and are driven apart by the removable the drive mechanism, wherein the oversleeve member is eliminated.

Advantageously, the removable drive mechanism is a re-usable component which, along with a suitable tool for rotating the bolt of the drive mechanism, may comprise a re-usable installation kit separate from the expansion rings, and may be used to install a number of expansion rings. Therefore, because each expansion ring need not include a drive mechanism which remains in place after installation, the overall cost of the expansion ring assemblies are reduced.

In one form thereof, the present invention provides an expansion ring assembly, including a ring including a pair of overlapping end portions, the end portions including ratcheting structures in engagement with one another; and a drive mechanism, including a pair of block members each having a threaded bore therein, the bores of the block members being oppositely threaded, the block members removably engaged with respective end portions of the ring; and a bolt including oppositely-threaded ends respectively threaded within the bores of the block members, whereby rotation of the bolt in a first direction causes the block members to be simultaneously driven apart from one another to thereby expand the ring and sequentially engage the ratcheting structures of the ring end portions with one another.

In another form thereof, the present invention provides an expansion ring assembly, including a ring including a pair of end portions, at least one of the end portions including first ratcheting structure; an oversleeve disposed in overlapping relationship with the ring end portions, the oversleeve including a pair of opposite ends, at least one of the opposite ends having second ratcheting structure in respective engagement with the first ratcheting structure of the ring end portions; and a drive mechanism, including a pair of block members each having a threaded bore therein, the bores of the block members being oppositely threaded, the block members removably engaged with respective end portions of the ring; and a bolt including oppositely-threaded ends respectively threaded within the bores of the block members, whereby rotation of the bolt in a first direction causes the block members to be simultaneously driven apart from one another to thereby expand the ring and sequentially engage the first ratcheting structure of the ring end portion with the second ratcheting structure of the oversleeve.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention any manner.

DETAILED DESCRIPTION

Figure 1:
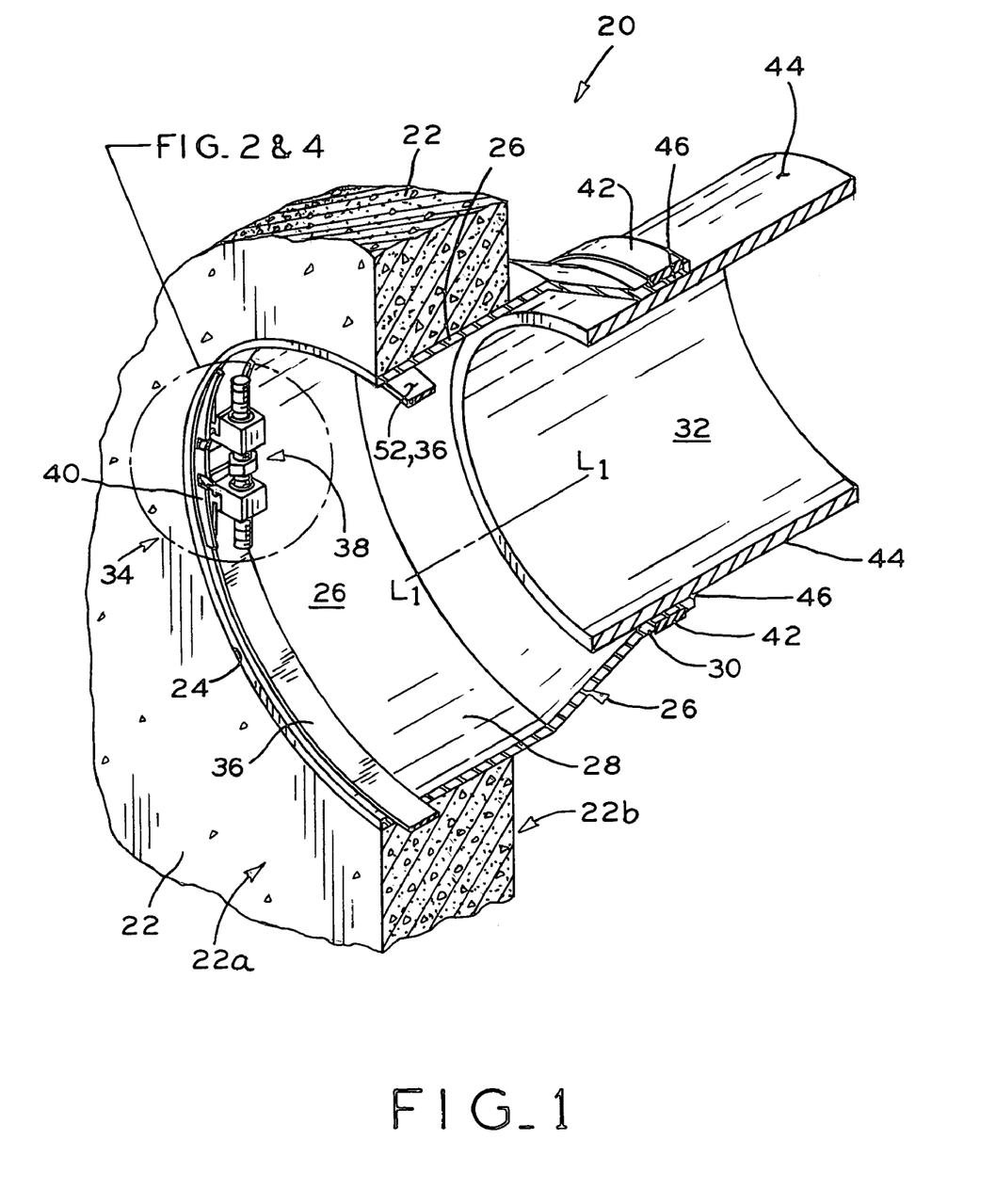
FIG. 1 is partial sectional view of a connection between a concrete structure and a pipe, the structure including a wall with an opening into which a gasket is sealingly fitted with an expansion ring assembly according to the present invention, further showing a pipe sealingly connected to the gasket.

Referring to FIG. 1, pipe connection 20 in an underground pipe system is shown, in which a pipe is connected to a structure, such as a manhole riser or monolithic base, for example. The structure may be formed of concrete, fiberglass, or any other suitable rigid material. The structure includes wall 22 having interior side 22a defining the interior of the structure, and exterior side 22b defining the exterior of the structure. Additionally, wall 22 includes annular opening 24. An annular gasket 26 includes a first portion 28 disposed within opening 24 of wall 22, and a second portion 30 extending from first portion 28. Gasket 26 may be made from a flexible, elastomeric material such as rubber or neoprene, for example, and provides a sealing connection between opening 24 in wall 22 of the structure and a pipe 32. First portion 28 of gasket 26 is sealingly engaged with opening 24 of wall 22 by expansion ring assembly 34, which generally includes expansion ring 36, drive mechanism 38, and oversleeve 40. As discussed in detail below, expansion ring assembly 34 is radially expandable to compress gasket 26 into sealing engagement with opening 24 in wall 22 to provide a fluid tight seal between gasket 26 and wall 22.

After first portion 28 of gasket 26 is sealingly engaged within opening 24 of wall 22 by expansion ring assembly 34, second portion 30 of gasket 26 is connected to pipe 32 by inserting pipe 32 through gasket 26, followed by installing one or more clamps 42 around second portion 30 of gasket 26 and then tightening clamps 42 to compress second portion 28 of gasket 26 into sealing engagement with outer surface 44 of pipe 32 to provide a fluid tight seal between gasket 26 and pipe 32. Second portion 30 of gasket 26 may include annular recessed seats 46 for receipt of clamps 42 to locate clamps 42 on second portion 30 of gasket 26.

In FIG. 1, only a portion of the length of pipe 32 is shown for clarity, it being understood that pipe 32 typically extends past expansion ring assembly 34 through opening 24 in wall 22, past inner surface 22a of wall 22, and into the interior of the structure. Also, expansion ring assembly 34 is shown in FIG. 1 with drive mechanism 38 disposed in approximately a nine o'clock position with respect to opening 24 for clarity. However, expansion ring assembly 34 may be selectively configured with drive mechanism 38 oriented in any desired position around the circumference of opening 24, it being noted that a configuration with drive mechanism 38 disposed in a twelve o'clock position may be favored in many applications. Further, the pipe connection of FIG. 1 may installed in a manner in which second portion 30 of gasket 26 extends inward of wall 22, in essentially the opposite manner shown in FIG. 1, such that clamps 42 are disposed within the structure. Further, although expansion ring assembly 34 is shown in FIG. 1 in an application in which expansion ring assembly 34 is used to seal a gasket within an opening in the wall of a structure, expansion ring assembly 34 may also be used in any application which generally involves the radial expansion of a flexible gasket into sealing engagement with a rigid structure. The details and operation of expansion ring assembly 34 are discussed below.

Figure 3:
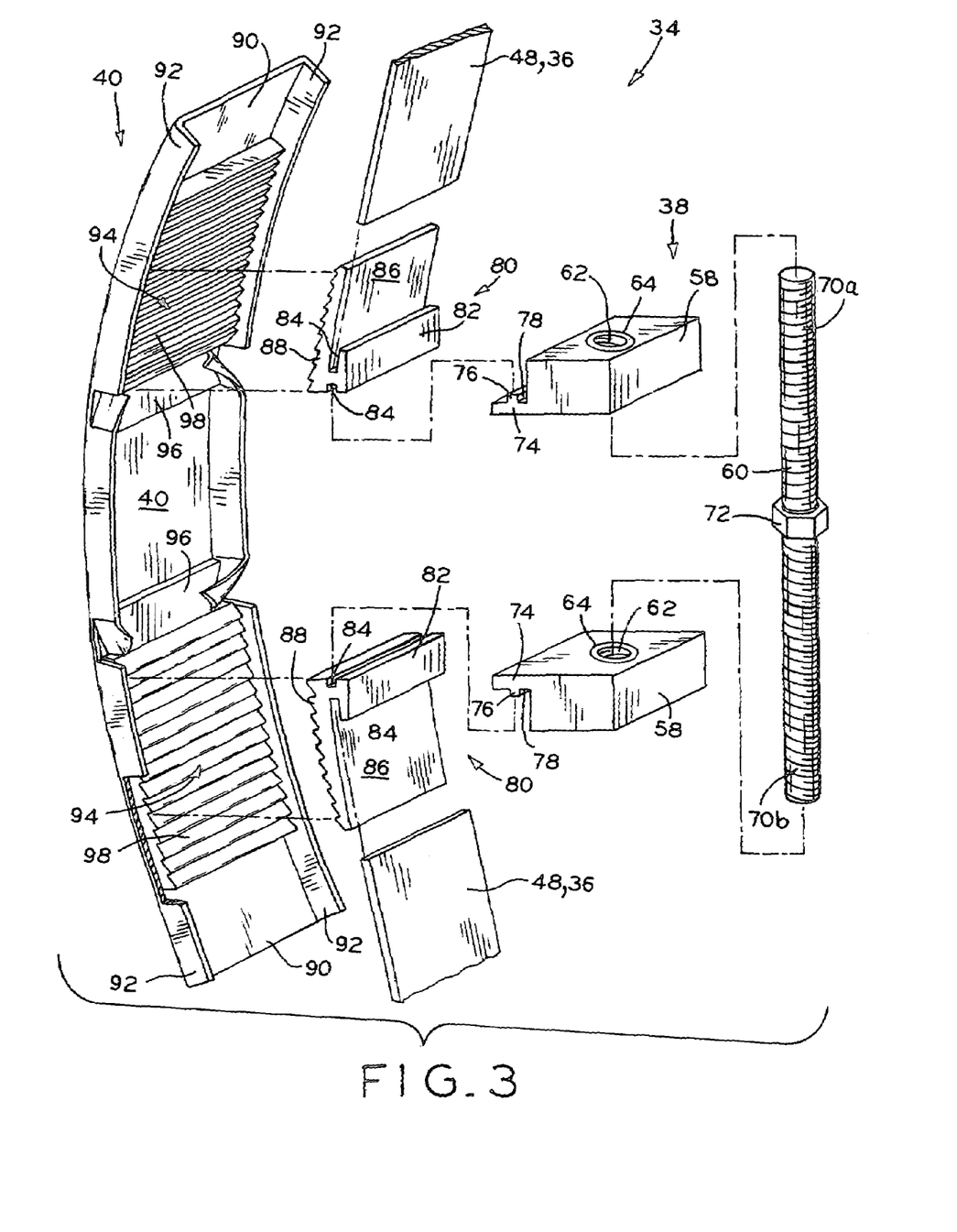
FIG. 3 is an exploded view showing the components of the expansion ring assembly of FIGS. 2 and 4.

Referring to FIG. 3, the components of expansion ring assembly 34 are shown. Expansion ring 36 is made of a continuous strip of material, such as stainless steel, other metals, or a rigid plastic, for example, and includes opposite ends 48. Expansion ring 36 includes a generally planar base wall 50 having outer surface 52 (FIG. 1) for engaging the interior surface of gasket 26. Expansion ring 36 in each of the embodiments disclosed herein may also optionally include side walls (not shown) projecting radially inwardly from base wall 50, such that base wall 50 and the side walls together define a generally U-shaped cross-sectional profile. Also, the ends 48 of expansion ring 36 may be bent slightly radially inwardly, such that drive mechanism 38 engages expansion ring ends 48 substantially along a chord line of the circle which is defined by expansion ring 36.

Drive mechanism 38 generally includes a pair of block members 58 and bolt 60. Block members 58 each include a threaded bore 62, which may be drilled in block members 58 if block members 58 are made of metal. Alternatively, block members 58 may be made of a rigid plastic and include threaded metal insert members 64 molded therein, with insert members 64 including threaded bores 62, as discussed in detail in U.S. patent application Ser. No. 10/885,285, entitled EXPANSION RING ASSEMBLY, filed on Jul. 7, 2004, assigned to the assignee of the present application, the disclosure of which is expressly incorporated herein by reference. The bores 62 of insert members 64 of the two block members 58 of each drive mechanism 38 are oppositely threaded, wherein the bore 62 of insert member 64 of one block member has right hand threads and the bore 62 of insert member 64 of the other block member has left hand threads. Similarly, bolt 60 includes oppositely-threaded ends 70a and 70b. Bolt 60 additionally includes a suitable tool-receiving fitting between bolt ends 70a and 70b, such as hexagonal nut portion 72 integrally formed with bolt 60. Although nut portion 72 is shown herein as having a hexagonal configuration, i.e., having six sides, other shapes for nut portion 72 are possible, wherein nut portion 72 may have four, five, six, or more sides, for example. Bolt ends 70a and 70b are threadingly engaged within the corresponding threaded bores 62 of block members 58 to connect block members 58 to bolt 60.

Referring to FIG. 3, block members 58 each include feet 74 having tongue 76 and groove 78. A pair of ratchet connectors 80 are provided, which fit between respective feet 74 of block members 58 and expansion ring ends 48. Ratchet connectors 80 may be made of metal or a rigid plastic, and each include T-heads 82 defining a pair of opposite slots 84, and body portions 86 including a series of ratchet teeth 88. T-heads 82 of ratchet connectors 80 are received within grooves 78 in feet 74 of block members 58, and tongues 76 in feet 74 of block members 58 are in turn received within slots 84 of ratchet connectors 80 to connect ratchet connectors 80 to block members 58. Also, ends 48 of expansion ring 36 are received within the opposite slots 84 of ratchet connectors 80 to connect ratchet connectors 80 to expansion ring ends 48. In this manner, ratchet connectors 80 are sandwiched between block members 58 and expansion ring ends 48. Optionally, respective pairs of ratchet connectors 80 and expansion ring ends 48 may be integrally formed with one another from metal or from a rigid molded plastic, for example, or ratchet connectors 80 may permanently secured to expansion ring ends 48 by mechanical fasteners or other suitable means.

Figure 4:
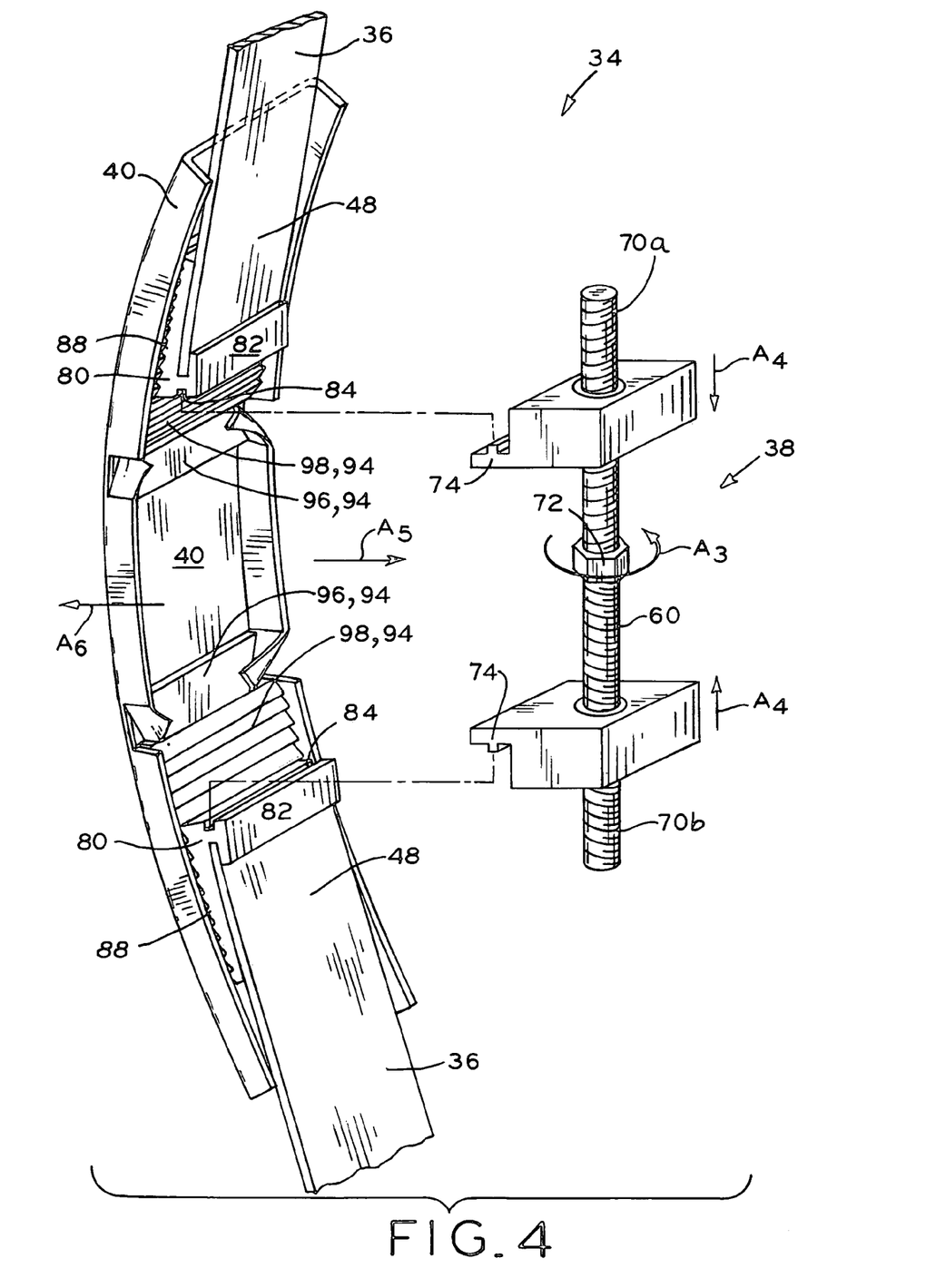
FIG. 4 is a partial perspective view of a portion of FIG. 1, showing retraction and removal of the drive mechanism of the expansion ring mechanism of the present invention after the ends of the expansion ring have been expanded to a desired extent, followed by removal of the drive mechanism.

Oversleeve 40 is formed of a segmented strip of material, such as stainless steel, other metals, or a rigid plastic. Oversleeve 40 includes base wall 90 and a pair of side walls 92 extending therefrom to define a U-shaped cross-sectional profile. The distance between side walls 92 of oversleeve 40 is slightly wider than the width of expansion ring 36, such that ends of 48 expansion ring 36 may nest within oversleeve 40 between side walls 92 of oversleeve 40, as shown in FIGS. 2-4.

Oversleeve 40 additionally includes a pair of plastic ratchet segments 94 which are connected to oversleeve 40 by crimping portions of sidewalls 92 of oversleeve 40 inwardly to engage with dovetail ends 96 of ratchet segments 94. Alternatively, ratchet segments 94 may be formed integrally with oversleeve 40 or may be attached to oversleeve 40 via rivets or other mechanical fasteners, for example. Ratchet segments 94 each include a plurality of ratchet teeth 98. As shown in FIG. 3, a pair of ratchet segments 94 are connected to oversleeve 40 in the above manner for engagement with the pair of ratchet connectors 80 in the manner discussed below.

Figure 2:
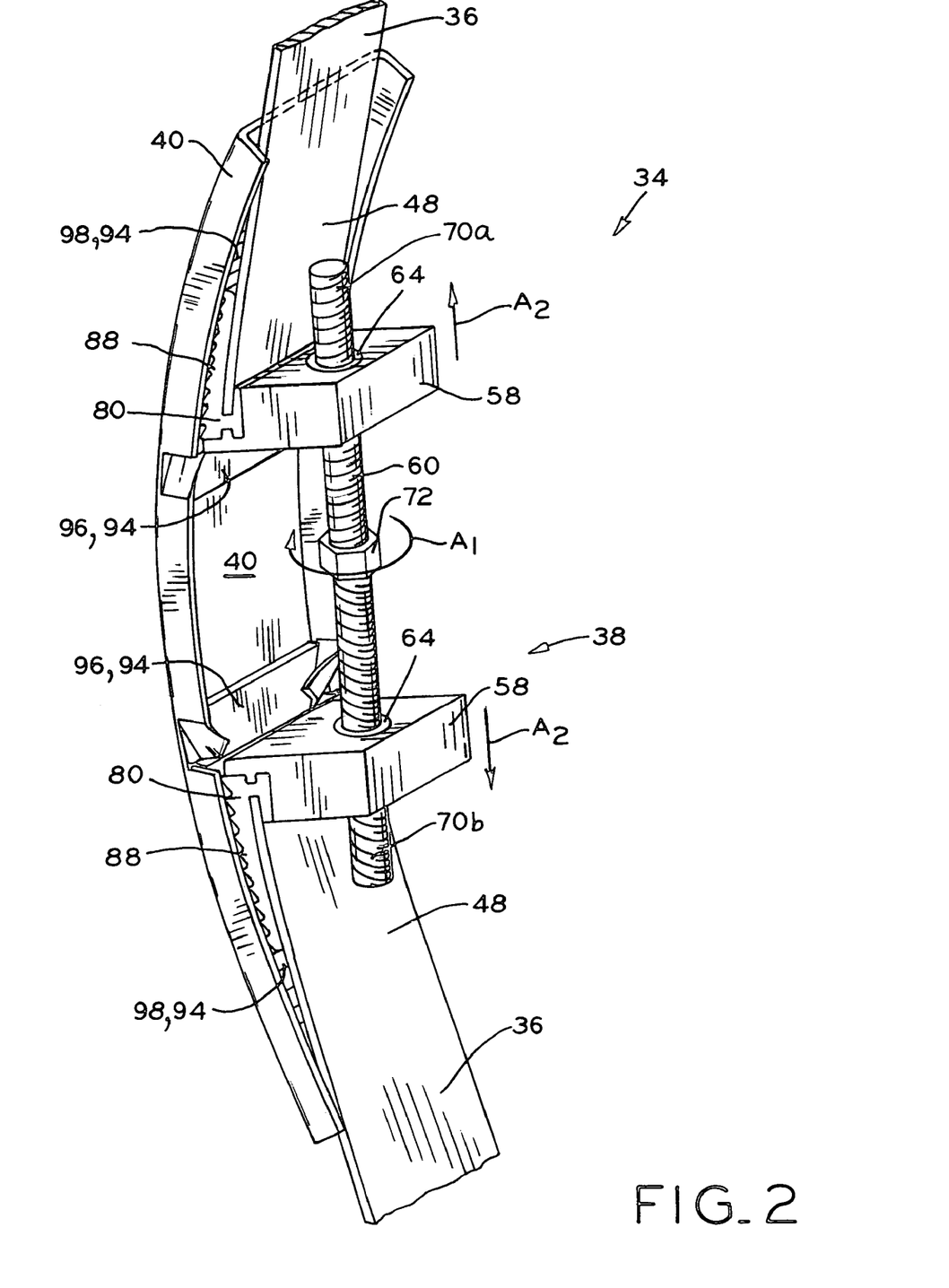
FIG. 2 is a partial perspective view of a portion of FIG. 1, showing the operation of the expansion ring assembly of the present invention to expand the expansion ring.

Referring to FIG. 2, oversleeve 40 is fitted over ends 48 of expansion ring 36, with ratchet teeth 88 of ratchet connectors 80 engaging ratchet teeth 98 of ratchet segments 94 of oversleeve 40. Optionally, as discussed in the above-incorporated U.S. patent application Ser. No. 10/885,285, a strip of tape (not shown) may be placed over both oversleeve 40 and expansion ring ends 48 to temporarily secure oversleeve 40 and expansion rings ends 48 to one another and prevent separation of the foregoing components in the field before installation. Upon expansion of expansion ring ends 48 outwardly from oversleeve 40 in the manner discussed below, the strip of tape is broken and the remainder of the tape may remain in place after installation.

In operation, expansion ring 36 is fitted radially within gasket 26 as shown in FIGS. 1 and 2, wherein the diameter of expansion ring 36 is less than the diameter of gasket 26. Thereafter, bolt 60 of drive mechanism 38 is rotated in a first direction along the arrow $A_1$ of FIG. 2 using a suitable tool such as a torque wench engaging nut portion 72 of bolt 60. The threaded engagement of oppositely-threaded ends 70a and 70b of bolt 60 with the optionally-threaded bores 62 or insert members 64 of the two block members 58 causes block members 58 to be driven apart from one another along bolt 60 during rotation of bolt 60. Concurrently, ratchet connectors 80 and ends 48 of expansion ring 36 are also forced apart from one another, during which ratchet teeth 88 of ratchet connectors 80 sequentially engage ratchet teeth 98 of ratchet segments 94 of oversleeve 40 as block members 58, ratchet connectors 80, and expansion ring ends 48 are expanded radially outwardly along the direction of the arrows $A_2$ of FIG. 2.

During such expansion, the installer will hear several audible clicking sounds as ratchet teeth 88 of ratchet connectors 80 sequentially engage ratchet teeth 98 of ratchet segments 94 of oversleeve 40. In this manner, the diameter of expansion ring 36 is expanded to sealingly compress gasket 26 between expansion ring 36 and opening 24 of wall 22.

When expansion ring 36 is expanded to a desired extent, as shown in FIG. 3, ratchet teeth 88 of ratchet connectors 80 engage ratchet teeth 98 of ratchet segments 94 of oversleeve 40 to prevent radial inward movement of ends 48 of expansion ring 36 toward one another, and to thereby maintain expansion ring 36 in an expanded condition. Thereafter, the installer rotates bolt 60 in an opposite direction from the first direction of rotation during expansion, i.e., along the arrow $A_3$ of FIG. 4, which causes block members 58 to move inwardly along bolt 60 in the direction of arrows $A_4$ of FIG. 4 and disengage from ratchet connectors 80 of expansion ring ends 48. After disengagement of block members 58 of drive mechanism 38 from ratchet connectors 80, drive mechanism 38, including block members 58 and bolt 60, may be removed from ends 48 of expansion ring 36 along the direction of arrow $A_5$ of FIG. 4, for example, or from along the direction of arrow $A_6$ parallel to a longitudinal axis $L_1$-$L_1$ (FIG. 1) of expansion ring 36 and gasket 26, to allow re-use of drive mechanism 38 to install another expansion ring 36. After removal of drive mechanism 38, expansion ring ends 48 of the installed expansion ring 36 are maintained in their expanded condition by the ratcheting engagement between ratchet connectors 80 of expansion ring ends 48 and ratchet segments 94 of oversleeve 40.

Figure 5:
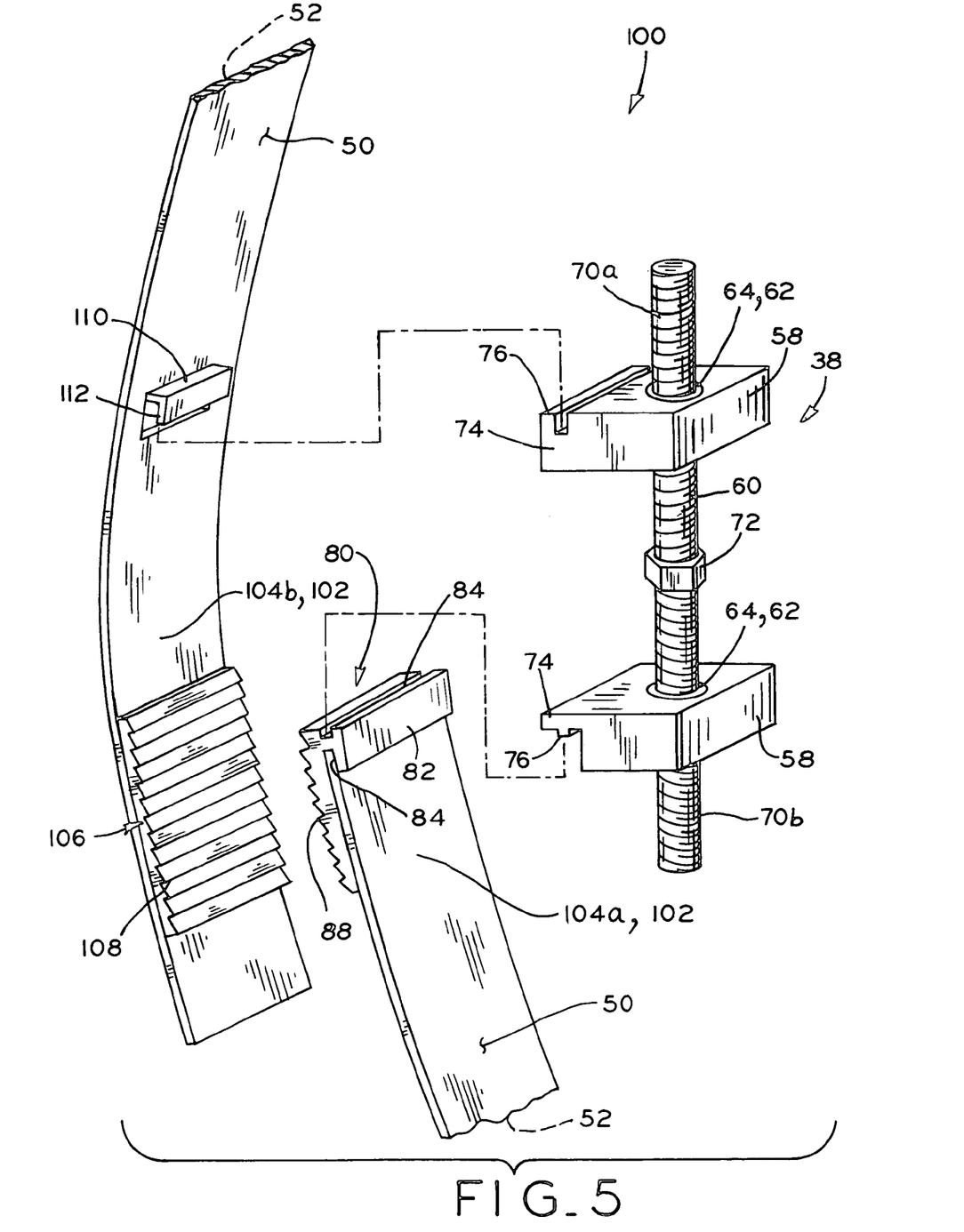
FIG. 5 is a partial perspective view showing an expansion ring and removable drive mechanism according to a second embodiment.

Referring to FIG. 5, an expansion ring assembly according to a second embodiment of the present invention is shown. Expansion ring assembly 100 includes several components which are identical or substantially identical to those of expansion ring assembly 34 described above, and the same reference numerals have been used to designate identical or substantially identical components therebetween.

Expansion ring assembly 100 includes an expansion ring 102 similar to expansion ring 36 described above, including base wall 50 and outer surface 52. Additionally, expansion ring 102 includes a pair of first and second end portions 104a and 104b which, rather than being circumferentially spaced from one another as in expansion ring 36, are in an overlapping relationship with respect to one another. First, or inner, end portion 104a of expansion ring 102 includes a ratchet connector 80, described above, and second, or outer, end portion 104b includes ratchet segment portion 106 having a plurality of ratchet teeth 108 which face, and are engagable with, ratchet teeth 88 of ratchet connector 80 of first end portion 104a. Ratchet segment portion 106 may be integrally formed with second end portion 104b, or may comprise a separate component made from metal or rigid molded plastic, for example, which is secured to second end portion 104b of expansion ring 102 via rivets or other suitable mechanical fasteners. Second end portion 104b of expansion ring 102 additionally includes stop portion 110 having tongue 112, which may be punched and formed from the metal material of second end portion 104b as shown in FIG. 5, or may comprise a separate component secured to expansion ring 102.

Advantageously, the same drive mechanism 38 described above with respect to expansion ring assembly 34 may also be used with expansion ring assembly 100 to expand expansion ring 102. Block members 58 of drive mechanism 38 are fitted to ratchet connector 80 of first end portion 104a and to stop portion 110 of second end portion 104b in the manner described above, respectively. Upon rotation of bolt 60 in a first direction, block members 58 are driven apart from one another as described above to sequentially engage ratchet teeth 88 of ratchet connector 80 with ratchet teeth 108 of ratchet segment portion 106 in the manner described above to radially compress gasket 26 against opening 24 in wall 22. Thereafter, as also described above, bolt 60 may be rotated in an opposite direction to allow disengagement and removal of drive mechanism 38 from expansion ring 102.

Notably, in the embodiment of FIG. 5, the need for a separate oversleeve 40 is eliminated due to the overlapped, ratcheting engagement of first and second end portions 104a, 104b of expansion ring 102, and additionally, the ratchet connector 80 associated with second end portion 104b of expansion ring 106 is also obviated, thereby reducing the total number of parts needed in expansion ring assembly 100 as compared with expansion ring assembly 34.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An expansion ring assembly, comprising:
   a ring including a pair of overlapping end portions, said end portions including ratcheting structures in engagement with one another; and
   a drive mechanism, comprising:
      a pair of block members each having a threaded bore therein, said bores of said block members being oppositely threaded, said block members removably engaged with respective end portions of said ring; and
      a bolt including oppositely-threaded ends respectively threaded within said bores of said block members, whereby rotation of said bolt in a first direction causes said block members to be simultaneously driven apart from one another to thereby expand said ring and sequentially engage said ratcheting structures of said ring end portions with one another.

2. The expansion ring assembly of claim 1, wherein said ratcheting structure of one of said ring end portions comprises a ratchet connector including a series of ratchet teeth, one of said block members removably engaged with said ratchet connector.

3. The expansion ring assembly of claim 2, wherein said ratchet connector is formed separately from said ring end portion.

4. The expansion ring assembly of claim 1, wherein said ratcheting structure of one of said ring end portions comprises a ratchet segment portion including a series of ratchet teeth.

5. The expansion ring assembly of claim 4, wherein said ratchet segment portion is formed separately from said ring end portion.

6. The expansion ring assembly of claim 4, wherein said one ring end portion further comprises a stop member, one of said block members removably engaged with said stop member.

7. The expansion ring assembly of claim 1, wherein said drive mechanism is disposed substantially within said ring.

8. The expansion ring assembly of claim 1, wherein each of said block members is made of a plastic material, and includes a threaded metal insert member molded therein.

9. The expansion ring assembly of claim 1, wherein said ring includes a longitudinal axis, said bolt disposed perpendicular to said longitudinal axis.

10. An expansion ring assembly, comprising:
   a ring including a pair of end portions, at least one of said end portions including first ratcheting structure;
   an oversleeve disposed in overlapping relationship with said ring end portions, said oversleeve including a pair of opposite ends, at least one of said opposite ends having second ratcheting structure in respective engagement with said first ratcheting structure of said ring end portions; and
   a drive mechanism, comprising:
      a pair of block members each having a threaded bore therein, said bores of said block members being oppositely threaded, said block members removably engaged with respective end portions of said ring; and
      a bolt including oppositely-threaded ends respectively threaded within said bores of said block members, whereby rotation of said bolt in a first direction causes said block members to be simultaneously driven apart from one another to thereby expand said ring and sequentially engage said first ratcheting structure of said ring end portion with said second ratcheting structure of said oversleeve.

11. The expansion ring assembly of claim 10, wherein each of said end portions of said ring include said first ratcheting structure and each of said ends of said oversleeve include said second ratcheting structure, with respective pairs of said first and second ratcheting structures in engagement with one another.

12. The expansion ring assembly of claim 10, wherein said at least one first ratcheting structures comprises a ratchet connector including a series of ratchet teeth, one of said block members removably engaged with said ratchet connector.

13. The expansion ring assembly of claim 12, wherein said ratchet connector is formed separately from said at least one ring end portion.

14. The expansion ring assembly of claim 10, wherein said at least one second ratcheting structure comprises a ratchet segment portion of said oversleeve, said ratchet segment portion including a series of ratchet teeth.

15. The expansion ring assembly of claim 10, wherein said drive mechanism is disposed substantially within said ring, and said block members are removably connected to respective end portions of said ring.

16. The expansion ring assembly of claim 10, wherein each of said block members is made of a plastic material including a threaded metal insert member molded therein.

17. The expansion ring assembly of claim 10, wherein said ring includes a longitudinal axis, said bolt disposed perpendicular to said longitudinal axis.

18. The expansion ring assembly of claim 10, wherein said end portions of said ring define an opening in said ring therebetween, said opening spanned by said drive mechanism.

* * * * *